(12) United States Patent
Matt

(10) Patent No.: US 7,345,581 B2
(45) Date of Patent: Mar. 18, 2008

(54) APPARATUS FOR MONITORING A MEASUREMENT TRANSMITTER OF A FIELD DEVICE

(75) Inventor: Christian Matt, Aesch (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/815,939

(22) Filed: Apr. 2, 2004

(65) Prior Publication Data

US 2005/0035867 A1  Feb. 17, 2005

(30) Foreign Application Priority Data

Apr. 2, 2003   (DE) ................ 103 15 106

(51) Int. Cl.
*G08B 1/08* (2006.01)
(52) U.S. Cl. ............... 340/539.26; 340/539.24; 340/539.28; 340/602
(58) Field of Classification Search .......... 340/539.26, 340/539.24, 529.28, 539.27, 568, 601, 602
See application file for complete search history.

(56) References Cited

U.S. PATENT DOCUMENTS 6,031,455 A * 2/2000 Grube et al. ........... 340/539.26
6,470,696 B1  10/2002 Palfy
6,937,148 B2 * 8/2005 Irwin ................... 340/539.1
6,940,403 B2 * 9/2005 Kail, IV ............... 340/539.12
2002/0140848 A1 10/2002 Cooper

FOREIGN PATENT DOCUMENTS

| DE | 42 07 396 A1 | 9/1993 |
| DE | 100 20 623 A1 | 11/2000 |
| DE | 299 22 745 U1 | 6/2001 |
| GB | 2 143 333 A | 2/1985 |
| JP | 09236298 | 9/1997 |
| JP | 2002338058 | 11/2002 |

* cited by examiner

*Primary Examiner*—Daryl C Pope
(74) *Attorney, Agent, or Firm*—Bacon & Thomas, PLLC

(57) ABSTRACT

An apparatus for monitoring a measurement transmitter of a field device determining and/or monitoring a physical and/or chemical process parameter, wherein at least one sensor is provided inside the a housing, in which the transmitter is arranged. The sensor determines the temperature and relative humidity in the housing over a period of time in predetermined intervals, and a control-/evaluation-unit is provided, which, on the basis of the measured temperature and relative humidity, determines the absolute humidity and/or the dewpoint in the housing of the transmitter, and issues and alarm when the absolute humidity and/or the dewpoint in the housing of the transmitter reaches a critical value.

8 Claims, 1 Drawing Sheet

APPARATUS FOR MONITORING A MEASUREMENT TRANSMITTER OF A FIELD DEVICE

FIELD OF THE INVENTION

The invention relates to an apparatus for monitoring a measurement transmitter of a field device determining and/or monitoring a physical and/or chemical process parameter.

BACKGROUND OF THE INVENTION

The process parameter can be, for example, the mass or volume flow rate of a medium flowing through a measuring tube. Of course, the parameter can also be fill level, pressure, temperature, moisture content, pH or the concentration of a substance in a medium, or some other process parameter.

In connection with the determining and/or monitoring of process parameters, the tendency is going increasingly in the direction of providing the user with, besides the actual measurement information, also information concerning the functioning or the operating life of the measuring device under the existing system- and/or process-conditions. Current catchwords in this connection are 'Predictive Maintenance' and 'Mean Time Before Failure'. The goal of these efforts is, in the final analysis, to exclude, or at least to reduce to a minimum, measuring device downtime.

A measuring device includes, usually, a sensor and a transmitter, with the latter containing the electrical and/or electronic components for measurement signal conditioning, for obtaining the measured value and/or for data transmission to a remote control location. Differences may exist between so-called compact devices, where sensor and transmitter form an integral unit, and measuring devices, where the sensor and the transmitter form units separated from one another.

In the case of industrially-used measuring devices, climatically difficult conditions often prevail. These are caused e.g. by more or less severe humidity- and temperature-changes, or by cleaning activities at the measuring device or in the vicinity of the measuring device. In order to protect moisture-sensitive electronic components in the transmitter housing from condensate, all joints and openings, such as lids, threaded cable connections, seams, and other seals must be made gas-tight. Under the previously-mentioned environmental conditions, it is still not to be ruled out that over time the seals will begin to be compromised. With frequent temperature changes, differences in pressure can arise between the interior of the housing and the surrounding environment. These differences are usually smaller than 200 mbar. A lower pressure in the transmitter housing can result in moist, warm air from the environment gradually being drawn into the interior of the transmitter. Through a kind of pump-effect, the air in the transmitter housing can gradually absorb so much moisture that, with a subsequent drop in the surrounding temperature, a liquid condensate becomes present in the transmitter housing. In the extreme case, this pump-effect leads to a so-called "flooding" of the transmitter, i.e. the electronic components come into direct contact with the condensate.

SUMMARY OF THE INVENTION

An object of the invention is to provide an apparatus, with which the danger of formation of condensate in the housing of a transmitter is reduced.

The object of the invention is achieved such that in the housing where the transmitter is arranged, at least one sensor is provided, which over a period of time in predetermined intervals determines the temperature and the relative humidity in the transmitter housing, and such that a control-/evaluation-unit is provided, which, on the basis of the measured temperature and relative humidity, determines the absolute humidity and/or dewpoint in the transmitter housing, and issues an alarm when the absolute humidity or dewpoint in the transmitter housing reaches a critical value. The temperature-/humidity-sensor, or sensors, as the case may be, can be implemented as integrated units or as separate units. Furthermore, the number of sensors in the individual categories can vary from one another. Depending on the application, it can therefore make sense to provide multiple temperature sensors in the transmitter housing but e.g. only one humidity sensor. Through this arrangement, temperature differences inside the housing can be taken into account upon the determination of the critical value. In practice, the case may occur, e.g., that in the area of the transmitter's interface, a lower temperature prevails than in the area of, or directly on, the circuit boards, which carry the electronic components.

In accordance with an advantageous development of the apparatus of the invention, the sensor for measuring temperature and relative humidity is an SMD-semiconductor-sensor. Exemplary in this role is the sensor SHT11 from the company named Sensirion. The advantage of a sensor of this kind is that a smaller, more highly-integrated semiconductor-sensor measures both the temperature and the relative humidity, and subsequently transmits the measurements, already in digital form, to a microprocessor. The microprocessor can, of course, be the same microprocessor in the control-/evaluation unit that provides the measurements for the process parameters.

An advantageous development of the invention provides a memory unit, in which a point or range of operation is predetermined for the temperature to which the transmitter, in its process environment, is normally exposed. Preferably, the control-/evaluation-unit already sets an alarm when a tolerance-value near the critical value is reached or subceeded, i.e. fallen beneath. It goes without saying that the point or range of operation for the temperature can also be freely predetermined by the operator in this development of the invention. This is especially preferred when the environmental conditions change over time. Preferably the input of the temperature value, or temperature range, as the case may be, is accomplished using an input unit. This can be arranged directly on the measuring device; however it can also be associated with a remote control location.

According to the invention, the control-/evaluation-unit selects the critical value such that even in the case of the lowest possible temperature in the range of operation, no condensate forms in the housing.

In accordance with an especially favorable embodiment of the apparatus of the invention, it is provided that the control-/evaluation-unit, on the basis of historical information, issues information on when the critical value for the dewpoint and/or the absolute humidity is predicted to be reached in the interior of the housing. If the control-/evaluation-unit recognizes that the absolute humidity or dewpoint in the transmitter housing is steadily rising, this is interpreted as a pump-effect. A corresponding report notifies the operator that the housing has a leak through which moisture-rich air is penetrating into the housing. On the basis of the historical data, the operator receives a concrete indication of the time when a failure of the transmitter due to the formation of condensate in the housing is to be expected. Appropriate countermeasures, e.g. replacement of the transmitter, can be taken in time so that it does not lead to downtime for the measuring device.

The invention will now be explained in greater detail on the basis of the drawings, which show as follows:

DESCRIPTION OF THE PREFERRED EMBODIMENTS

Figure 1:
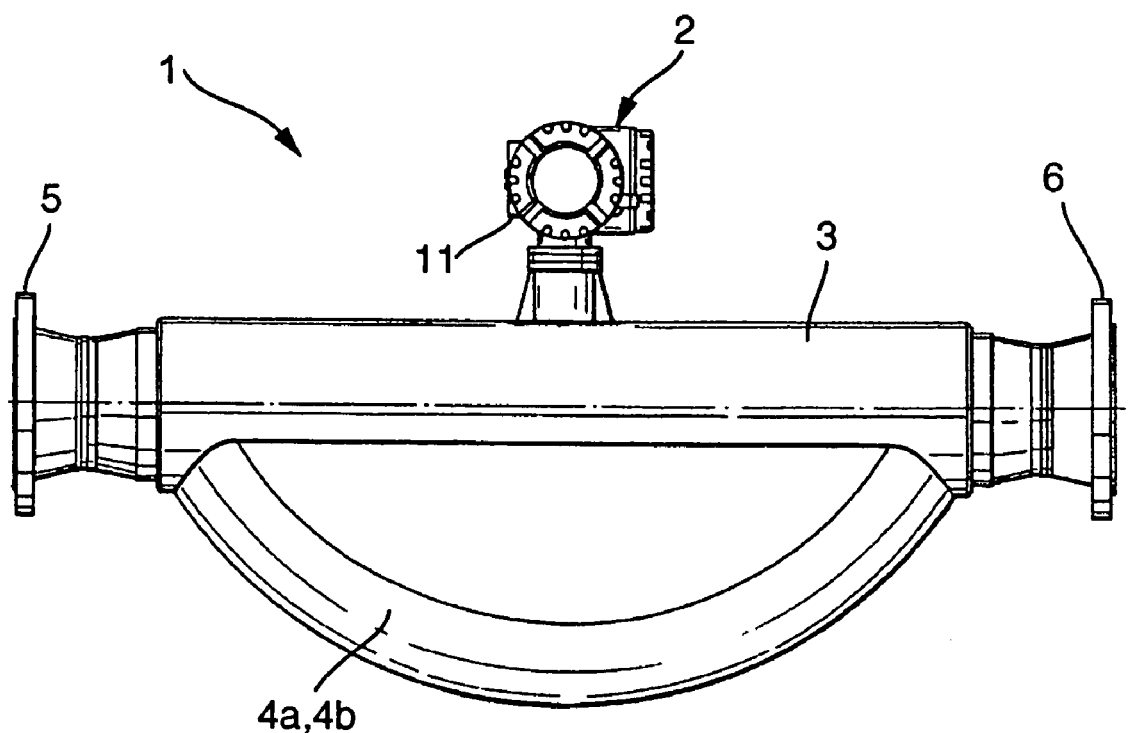
FIG. 1: a side view of a Coriolis flowmeter

FIG. 1 shows a side view of a Coriolis measuring device 1, or a vibration-type measuring device, which is suited for measuring flow rate, density, and/or viscosity. The sensor 3, in operation, is inserted into a pipeline, not separately shown in FIG. 1, through which the medium flows. The medium can be steam or vapor, a gas, or a liquid. The measuring device 1, in the case represented here, is inserted into the pipeline using the flanges 5, 6. Of course, the connection into the pipeline can also be accomplished using other fasteners, e.g. Triclamp connectors, or threaded connections.

In the illustrated case, the sensor 3 has two parallel, curved measuring tubes 4a, 4b, through which the medium is conducted. The measuring tubes can also be straight.

It is equally possible to fit the Coriolis measuring device 1 with only one measuring tube 4.

In operation, the measuring tubes 4a, 4b are excited to tuning fork-like vibrations, preferably to resonance-vibrations, by an exciter-arrangement most often fixed at the apex of the measuring tubes 4a, 4b. Sensor-arrangements, which sense the vibrations, are normally arranged on the inlet- and outlet ends of the measuring tubes 4a, 4b. Exciter-arrangements and sensor-arrangements are not represented separately in FIG. 1. Coriolis measuring devices, incidentally, are offered and sold under the mark PROMASS in a wide variety of models by the assignee.

Figure 2:
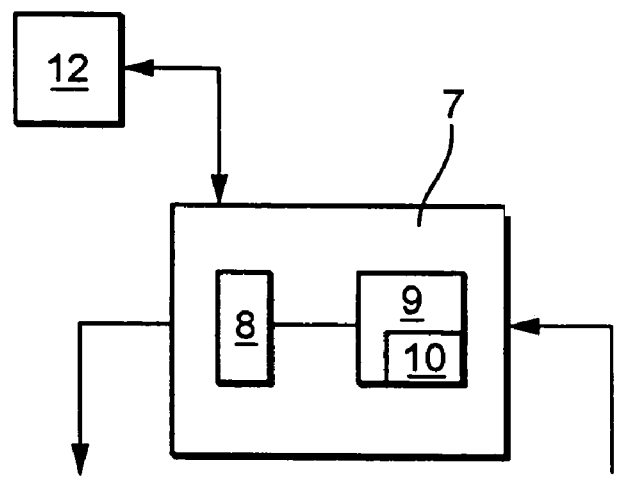
FIG. 2: a schematic representation of a control-/evaluation-unit with integrated sensor for determining temperature and relative humidity.

The transmitter 2 in the case shown here is secured directly on the sensor 3, and together with it, forms a compact device. The transmitter 2 includes an encapsulated, gas-tightly sealed housing 11, in which at least the electric and/or electronic components of the control-/evaluation-unit 7 are arranged. Essential components of the control-/evaluation-unit 7 are—as represented schematically in FIG. 2—a microprocessor 9 and a memory unit 10. In the memory unit 10, in accordance with a preferred embodiment of the apparatus of the invention, tables or functions or fitted functions are saved, from which the absolute humidity and/or the dewpoint are/is determinable, given knowledge of the current temperature—and relative humidity in the housing 11, plus knowledge of the interior volume of the housing 11.

Measurement of current temperature and relative humidity in the housing 11 is accomplished by means of the sensor 8. Sensor 8 is preferably a highly-integrated SMD-semiconductor sensor, distinguished in that it is relatively inexpensive, and, on account of its compact construction, requires little space; in addition, it delivers the measurements already in digital form. Thus, an A/D conversion is unnecessary, and the measurements can be evaluated directly by the microprocessor 9. It goes without saying that any other embodiment of the temperature sensor and/or the humidity sensor can also be used in connection with the apparatus in accordance with the invention. It is, of course, also possible to arrange a temperature sensor and a separate humidity sensor in the housing 11.

As soon as it is indicated, on the basis of the measurements of the temperature-/humidity-sensor 8, that the temperature in the housing 11 is approaching the calculated critical dewpoint or the calculated critical absolute humidity, and/or that the corresponding critical value has been reached, the control-/evaluation-unit 7 issues a corresponding warning report. On the basis of recorded historical information, it can, additionally, be predicted when the critical value for the dewpoint and/or the absolute humidity will probably be reached in the interior of the housing 11. Consequently, the operator can already be informed in advance—thus when the measuring device 1 is still functioning correctly—as to when a failure of the measuring device 1 is to be expected. In addition, it is possible to notify the operator, in advance, that leaks are present in the transmitter 2.

As already mentioned above, the apparatus of the invention is applicable in connection with any measuring device 1 used in the field of process measurements. Measuring devices 1 for a wide variety of task formulations are offered and sold by the Endress+Hauser Group.

The invention claimed is:

1. An apparatus for monitoring a measurement transmitter of a field device the field device performing one of: determining and monitoring one of: a physical and chemical process parameter, the field device including a sensor and a transmitter, the apparatus, comprising:
   a housing;
   at least a second sensor provided in said housing for determining the temperature and relative humidity in said housing over a period of time in predetermined intervals; and
   a control-/evaluation-unit, which, on the basis of the determined temperature and relative humidity, determines the absolute humidity and/or dewpoint in said housing, and issues an alarm when the absolute humidity and/or dewpoint in said housing reaches a critical value, wherein:
   the sensor of the field device is connected in close proximity to said housing; and
   the transmitter of the field device is mounted on the sensor.

2. The apparatus as claimed in claim 1, wherein:
   said at least said second sensor for measuring temperature and relative humidity is an SMD-semiconductor-sensor.

3. The apparatus as claimed in claim 1, further comprising:
   a memory unit in which a point, or range, of operation for the temperature is predetermined.

4. The apparatus as claimed in claim 1, further comprising:
   an input unit, by means of which the point, or range, of operation for the temperature can be entered.

5. The apparatus as claimed in claim 1, wherein:
said control-/evaluation-unit sets the critical value, such that, in the case of the lowest possible operating temperature, no condensate forms in said housing.

6. The apparatus as claimed in claim 1, wherein:
said control-/evaluation-unit sets an alarm when a predetermined tolerance-value near the critical value is reached or subceeded.

7. The apparatus as claimed in claim 6, wherein:
said control-/evaluation-unit, on the basis of historical information, issues information on when the critical value is predicted to be reached.

8. The apparatus as claimed in claim 1, wherein:
said housing is mounted on the sensor of the field device.

* * * * *